United States Patent [19]
Keller et al.

[11] Patent Number: 5,932,335
[45] Date of Patent: *Aug. 3, 1999

[54] OXIDATION RESISTANT FIBER-REINFORCED COMPOSITES WITH POLY(CARBORANE-SILOXANE/SILANE-ACETYLENE)

[75] Inventors: Teddy M. Keller, Alexandria, Va.; David Y. Son, Plano, Tex.

[73] Assignee: The United States of America as represented by the Secretary of the Navy, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,486

[22] Filed: Dec. 31, 1996

[51] Int. Cl.$^6$ .................................................. B32B 5/28
[52] U.S. Cl. ...................... 428/293.4; 427/228; 427/387; 427/389.7; 427/407.1; 427/407.3; 428/294.1; 428/298.7; 428/299.1; 428/299.4; 428/408; 428/447
[58] Field of Search ...................................... 427/228, 387, 427/389.7, 407.1, 407.3; 428/293.4, 294.1, 299.1, 298.7, 299.4, 408, 447

[56] References Cited

U.S. PATENT DOCUMENTS

| | | | |
|---|---|---|---|
| 4,613,522 | 9/1986 | Vasilos | 427/202 |
| 4,668,579 | 5/1987 | Strangman | 428/367 |
| 4,894,286 | 1/1990 | Gray | 428/408 |
| 5,272,237 | 12/1993 | Keller et al. | 528/5 |
| 5,292,779 | 3/1994 | Keller et al. | 522/99 |
| 5,348,917 | 9/1994 | Keller et al. | 501/92 |
| 5,483,017 | 1/1996 | Keller et al. | 528/5 |
| 5,563,181 | 10/1996 | Keller et al. | 522/99 |

OTHER PUBLICATIONS

Son, Dy et al, "Linear Siloxane–Acetylene Polymers as Precursors to High Temperature Materials" Fire and Polymers II, Gordon L Nelson, ed. ACS Symposium Series 599, American Chemical Society, 1995 Edition, Chapter 19, pp. 280–289, Aug. 1995.

Son Dy et al, "Synthesis and characterization of Linear Siloxane–Diacetylene Polymers" Macromolecules 1995, 28, pp. 399–400.

Henderson, LJ et al, "Synthesis and Characterization of Poly(carborane–siloxane–acetylene)" Macromolecules 1994, 27 pp. 1660–1661.

Keller et al, "Inorganic/Organic Hybrid Polymers (High Temperature, Oxidatively Stable)", Polymeric Materials Encyclopedia: Joseph C. Salamone, ed., CRC Press, New York vol. 5(H–L), pp. 3262–3269, 1996.

*Primary Examiner*—D. S. Nakarani
*Attorney, Agent, or Firm*—Thomas E. McDonnell; Ralph T. Webb

[57] ABSTRACT

An oxidation resistant fiber-reinforced composite is made by impregnating a fibrous material with a resin containing a linear polymer having a repeating unit with at least one carboranyl group, at least one silyl or siloxyl group and at least one acetylenic group. The linear polymer may then be cured to form a fiber-reinforced thermoset or may be pyrolyzed to form a fiber-reinforced ceramic. For additional protection of the fibrous material against oxidation, the fibrous material may be prewetted or coated, also with a linear polymer containing a linear polymer having a repeating unit with at least one carboranyl group, at least one silyl or siloxyl group and at least one acetylenic group, prior to being impregnated. The coating on the fibrous material may be cured to form a thermoset coating on the fibers or may be pyrolyzed to form a ceramic coating on the fibers.

29 Claims, No Drawings ered in the form of powders to the precursor resin that becomes the carbonous matrix. When the composite is exposed to high temperatures in an oxidizing environment, the boron, silicon and titanium serve as oxygen getters to protect the composite from oxidation. The boron, silicon and titanium are converted into oxides to form a sealant glass that fills microcracks in the composite. In each of the above composites, the effectiveness of the thermal protection depends on how well or how thoroughly the protective elements can be dispersed throughout or coated onto the composite.

OXIDATION RESISTANT FIBER-REINFORCED COMPOSITES WITH POLY (CARBORANE-SILOXANE/SILANE-ACETYLENE)

BACKGROUND OF THE INVENTION

1. Field of the Invention

The invention relates to fiber-reinforced composites and, more specifically, to composites having fibers dispersed through a thermoset or ceramic matrix wherein the matrix is formed by curing or pyrolyzing a linear polymer having repeating units of carborane, siloxane or silane and acetylene.

2. Background of the Related Art

Fiber-reinforced composites, for example, carbon-carbon composites having carbon fibers embedded in a carbonaceous matrix, are strong, lightweight materials that have many uses, including as structural components in missile, aircraft and aerospace vehicles.

A drawback to using fiber-reinforced composites in harsh environments is that the matrix or the fibers may oxidize and erode when exposed to high temperatures, causing a breakdown and failure of the composite material. Efforts have been made to improve the oxidation resistance of fiber-reinforced composites by creating a barrier coating over the material or by adding compounds containing boron and silicon or other refractory elements to the fibers or the matrix. For example, U.S. Pat No. 4,668,579 to Strangman et al describes a carbon-carbon fiber composite that is protected from oxidation by having a protective underlayer of boron carbide and a protective overlayer of silicon carbide deposited onto the fibers by chemical vapor deposition (CVD). Under oxidating conditions, the boron carbide and silicon carbide are converted into boron oxide and silicon dioxide. U.S. Pat. No. 4,894,286 to Gray describes an oxidation-resistant carbonous composite having boron, silicon and titanium elements or compounds dispersed throughout the structure. The boron, silicon and titanium are added in the form of powders to the precursor resin that becomes the carbonous matrix. When the composite is exposed to high temperatures in an oxidizing environment, the boron, silicon and titanium serve as oxygen getters to protect the composite from oxidation. The boron, silicon and titanium are converted into oxides to form a sealant glass that fills microcracks in the composite. In each of the above composites, the effectiveness of the thermal protection depends on how well or how thoroughly the protective elements can be dispersed throughout or coated onto the composite.

It is an object of the invention to provide an oxidation resistant fiber-reinforced composite that has protective components coated onto the fibers and homogeneously distributed throughout the composite. It is a further object of the invention to provide an oxidation resistant fiber-reinforced composite made from materials that are easily processed.

It has recently been discovered that boron-containing, silicon-containing and carbon-containing moieties can be combined into linear inorganic-organic hybrid polymers that can be used to make oxidatively stable thermosets and ceramics. Such linear inorganic-organic hybrid polymers, specifically, carborane-siloxane/silane-acetylene polymers and their corresponding thermosets and ceramics, are disclosed in U.S. Pat. Nos. 5,272,237; 5,292,779; 5,348,917 and 5,483,017, in the U.S. Patent Application entitled "Thermoset Polymers Made by Blending Poly(carborane-siloxane/silane-acetylene) and Poly(siloxane-acetylene)" filed Nov. 13, 1996, and in the U.S. Patent Application entitled "Improved Method for Synthesis of Linear Inorganic-Organic Hybrid Polymers" filed as a Statutory Invention Registration on Nov. 27, 1996. Polymers that include carboranyl, silyl or siloxyl and acetylenic groups in the same polymeric chain combine the desirable features of both inorganics and organics: the carborane groups provide thermal and oxidative stability, the silane or siloxane groups provide additional thermal stability and chain flexibility and the acetylenic groups allow cross-linking of adjacent polymer strands to form thermosets. Carborane-silane/siloxane-acetylene polymers have the advantage of being extremely easy to process and convert into thermosets or ceramics since they are either liquids at room temperature or low melting solids and are soluble in most organic solvents.

SUMMARY OF THE INVENTION

It has now been found that poly(carborane-siloxane/silane-acetylene) thermosets and ceramics can be used to create oxidation resistant fiber-reinforced composites and that cured or pyrolyzed carborane-siloxane/silane-acetylene polymers protect the fibrous material in a fiber-reinforced composite from oxidation at elevated temperatures. An oxidation resistant fiber-reinforced composite according to the present invention is formed by impregnating a fibrous material with a resin comprising a linear polymer having a repeating unit comprising at least one carboranyl group, at least one silyl or siloxyl group and at least one acetylenic group. The linear polymer is then cured to form a fiber-reinforced thermoset or pyrolyzed to form a fiber-reinforced ceramic. For additional protection, the fibrous material may be prewetted or coated, also with a linear polymer having a repeating unit comprising at least one carboranyl group, at least one silyl or siloxyl group and at least one acetylenic group, prior to being impregnated. The coating on the fibrous material may be cured to form a thermoset coating on the fibers or may be pyrolyzed to form a ceramic coating on the fibers.

Using a linear polymer that has silicon-containing and boron-containing moieties incorporated directly into the backbone of the polymer chain to coat the fibrous material and to form the matrix of the composite ensures that the silicon-containing and boron-containing moieties are spread homogeneously onto the fibers and throughout the composite and ensures that no gaps or microcracks occur that could lead to thermal failure of the composite. Because carborane-silane/siloxane-acetylene polymers are generally liquid at room temperature, the polymers are easy to process and easy to use for coating and impregnating a fibrous material.

DETAILED DESCRIPTION OF THE PREFERRED EMBODIMENTS

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

The invention relates to an oxidation resistant composite made up of a thermoset or ceramic matrix and reinforcing fibers dispersed within the matrix. The matrix is a product obtained by curing or pyrolyzing a linear polymer having a repeating unit comprising at least one carboranyl group, at least one silyl or siloxyl group and at least one acetylenic group.

The invention further relates to oxidation resistant fiber/thermoset and fiber/ceramic composites and methods of making them by the process of applying a first linear polymer having a repeating unit comprising at least one carboranyl group, at least one silyl or siloxyl group, and at least one acetylenic group, to a fibrous material to create a coating of the first linear polymer on the fibrous material, impregnating the coated fibrous material with a resin that includes a second linear polymer having a repeating unit comprising at least one carboranyl group, at least one silyl or siloxyl group, and at least one acetylenic group and either curing the impregnated fibrous material to create a fiber/thermoset composite or pyrolyzing the impregnated fibrous material to create a fiber/ceramic composite.

The fibrous material used in the present invention can be any two-dimensional or three-dimensional, woven or non-woven fibrous material useful in creating fiber-reinforced composites. Examples of useful fibers and fibrous materials are given in U.S. Pat No. 4,894,286 and U.S. Pat. No. 5,002,750, the entire disclosures of which are hereby incorporated herein by reference. Preferably, the fibers are carbon fibers or silicon carbide fibers. The terms "fibers" and "fibrous material" are used interchangeably herein to refer to any type of reinforcing fiber.

The first linear polymer, used to coat the fibrous material before it is impregnated, and the second linear polymer, used to impregnate the fibrous material and which becomes the matrix of the fiber-reinforced composite, are linear carborane-silane/siloxane-acetylene polymers such as are described in U.S. Pat. No. 5,272,237, U.S. Pat. No. 5,292,779, U.S. Pat No. 5,348,917, U.S. Pat. No. 5,483,017, the U.S. Patent Application entitled "Thermoset Polymers Made by Blending Poly(carborane-siloxane/silane-acetylene) and Poly(siloxane-acetylene)" filed Nov. 13, 1996, and the U.S. Patent Application entitled "Improved Method for Synthesis of Linear Inorganic-Organic Hybrid Polymers" filed as a Statutory Invention Registration on Nov. 27, 1996. The disclosures of the above patents and patent applications are hereby incorporated by reference. The first linear polymer and the second linear polymer are preferably compounds selected from the group consisting of wherein:

(1) n is an integer from 1 to 12 and u and y are positive integers;

(2)

represents an unconjugated acetylenic group or conjugated acetylenic groups when n is an integer greater than 1;

(3) $R^1$, $R^2$, $R^3$ and $R^4$ may be the same or different and are selected from the group consisting of alkyl, aryl, alkylaryl, haloalkyl, haloaryl and mixtures thereof;

(4)

represents a carboranyl group; and (5) q and q' are integers from 3 to 16;

(6) x represents an integer greater than or equal to zero; and (7) E is selected from the group consisting of O, an aliphatic bridge, an aryl bridge and mixtures thereof; and (3)

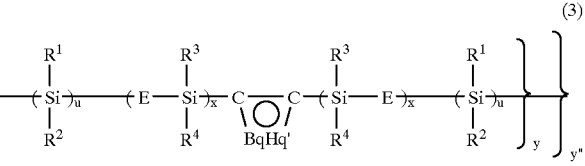

wherein (1) n and n' are integers from 1 to 12 and u, u', y, y' and y" are positive integers;

(2)

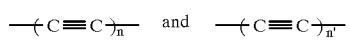

represent unconjugated acetylenic groups or conjugated acetylenic groups when n and n' are integers greater than 1;

(3) $R^1$, $R^2$, $R^3$, $R^4$, $R^5$, $R^6$, $R^7$ and $R^8$ may be the same or different and are selected from the group consisting of alkyl, aryl, alkylaryl, haloalkyl, haloaryl and mixtures thereof;

(1)

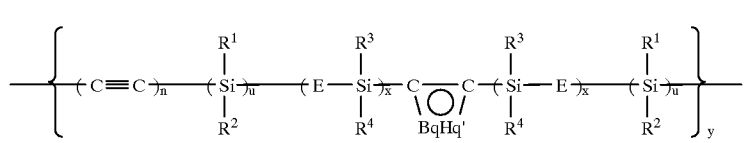

(4)

represents a carboranyl group; and (5) q and q' are integers from 3 to 16;

(6) x and x' represent integers greater than or equal to zero; and (7) E is selected from the group consisting of O, an aliphatic bridge, an aryl bridge and mixtures thereof;

(8) A is selected from the group consisting of O, an aliphatic bridge, an aryl bridge and mixtures thereof (9) wherein A and E may be the same or different;

The first linear polymer and the second linear polymer may be the same or different, but are preferably the same. Most preferably, the first linear polymer and the second linear polymers are compounds represented by the formula:

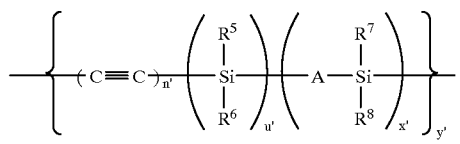

where y is a positive integer.

To reduce costs, it may sometimes be desirable to reduce the amount of carborane in the fiber-reinforced composite, relative to the amount of silane or siloxane and acetylene. This can be done by using first linear polymers and second linear polymers that have a lesser amount of carborane relative to other substituents. An example of such a linear polymer is that represented by formula (3) above (and described in U. S. Pat. No. 5,483,017) wherein y' is greater that y (that is, where the number of silane/siloxane-acetylene units is greater than the number of carborane units), or by adding to the coating for the fibrous material and to the resin for impregnating the fibrous material a linear non-carborane-containing polymer represented by the formula:

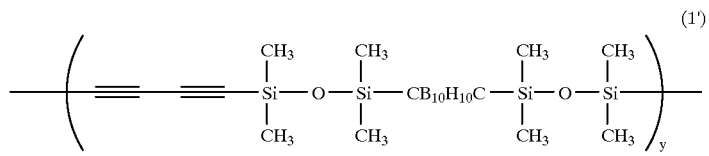

wherein:

(1) n' is an integer from 1 to 12 and u' and y' are positive integers;

(2)

represents an unconjugated acetylenic group or conjugated acetylenic groups when n is an integer greater than 1.

(3) $R^5$, $R^6$, $R^7$, $R^8$ may be the same or different and are selected from the group consisting of alkyl, aryl, alkylaryl, haloalkyl, haloaryl and mixtures thereof;

(4) x' represents an integer greater than or equal to zero; and (5) A is selected from the group consisting of O, an aliphatic bridge, an aryl bridge and mixtures thereof.

The linear non-carborane-containing polymer is preferably a compound of the formula

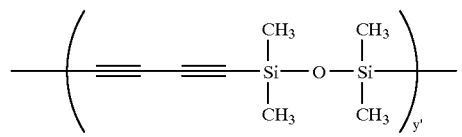

where y' is an integer. Examples of mixtures of carborane-containing and non-carborane-containing linear polymers are described in the U.S. Patent Application entitled "Thermoset Polymers Made by Blending Poly(carborane-siloxane/silane-acetylene) and Poly(siloxane-acetylene)" filed by the present inventors on Nov. 13, 1996. These mixtures can be used to coat and impregnate the fibrous material to create fiber-reinforced thermoset and ceramic composites with a reduced amount of carborane.

Although fibrous material may be impregnated directly with the resin that includes the second linear polymer to form a fiber-reinforced composite according to the present invention without going through a prewetting or coating step, it is preferred that the fibers be prewetted or coated with the first linear polymer before the impregnation step. Prewetting or coating the fibrous material with the first linear polymer may be accomplished by any method known in the art and is preferably done by diluting the first linear polymer with a suitable solvent such as methylene chloride, dipping the fibrous material into the dilute solution and then air-drying the fibrous material to remove the solvent and leave a coating of the first linear polymer on the fibrous material. When the fibrous material is composed of fibers such as carbon fibers that are particularly prone to oxidation, it is preferable that the first linear polymer be coated onto the fibrous material and then be cured or pyrolyzed to create a thermoset coating or a ceramic coating on the fibers. Curing of the first linear polymer to create a thermoset coating is carried out by exposing the coated fibrous material to heat, typically at a temperature above about 150° C. and below about 450° C. or to light to effect the cross-linking of the carbon-carbon triple bonds of the acetylene moieties of the polymer. The preferred temperature for curing by heating is below 450° C., since pyrolysis begins to occur above that temperature. If light is used to effect the cross-linking, the preferred wavelength is in the uv range. Pyrolysis of the first linear polymer to create a ceramic coating is carried out by exposing the coated fibrous material to sufficient heat, generally above about 450° C., to convert the polymer into a ceramic. For even greater protection against oxidation, the steps of coating and curing or of coating and pyrolyzing may be repeated to create layers of the thermoset coating or the ceramic coatings on the fibers.

The step of impregnating the fibrous material with the resin that includes the second linear polymer may be carried out by any method known in the art for creating a fiber-reinforced composite, including by adding the resin to the fibrous material or by adding the fibrous material to the resin. Preferably, the resin is composed primarily of the second linear polymer or of a mixture of the second linear polymer and a non-carborane-containing linear polymer as described above. Curing of the impregnated fibrous material to create a fiber/thermoset composite is carried out by exposing the impregnated fibrous material to heat, typically above about 150° C. and below about 450° C., to effect the cross-linking of the carbon-carbon triple bonds of the second linear polymer. Exposing the fibrous material to heat in this temperature range would also effect curing of any previously uncured first linear polymer attached to the fibers. Pyrolysis of the impregnated fibrous material to create a fiber/ceramic composite is carried out by exposing the impregnated fibrous material to sufficient heat, typically above about 450° C., preferably above about 700° C. to convert the second linear polymer into a ceramic. Exposing the fibrous material to heat above about 450° C. would also effect pyrolysis of any previously unpyrolyzed first linear polymer attached to the fibers.

In making ceramic-coated fibers or fiber-reinforced ceramics, it is important to avoid creating defects or disruptions that may be caused by the evolution of volatiles during the pyrolyzing process. Such an evolution of volatiles can be caused by heating a pyrolyzable material too rapidly in the temperature range where volatiles are most likely to be produced, generally in the range between about 500° C. and about 700° C. In making ceramic-coated fibers or fiber/ceramic composites according to the present invention, the damage to the coating on the fibers from the evolution of volatiles during the pyrolyzing process can be minimized by limiting the heating rate of the coated fibers or the impregnated fibrous material in the range between about 500° C. and about 700° C. to less than about 1° C. per minute.

Pyrolysis of the coated fibrous material or the impregnated fibrous material by heating to a temperature above about 450° C. necessarily proceeds through an intermediate step of curing the first linear polymer or the second linear polymer, since to reach the pyrolysis temperature, the material must be brought through the temperature range that effects curing. In some instances, it may be desirable to cure the coated fibrous material or the impregnated fibrous material and then carry out pyrolysis at a subsequent time. Accordingly, the invention includes a fiber/ceramic composite made by the process of applying a coating of the first linear polymer to the surfaces of a fibrous material curing the first linear polymer to create a thermoset coating on the fibrous material, pyrolyzing the thermoset coated fibrous material to create a ceramic coating on the fibrous material, impregnating the ceramic coated fibrous material with the resin that includes the second linear polymer, curing the impregnated fibrous material to create a fiber/thermoset composite, and then pyrolyzing the fiber/thermoset composite to create a fiber/ceramic composite.

EXAMPLES

The following examples outline preferred embodiments of the present invention. In the examples, the term poly (carborane-siloxane-acetylene) refers to a polymer represented by formula (1'), above. The term poly (carborane-siloxane-acetylene) copolymer refers to a compound represented by the formula:

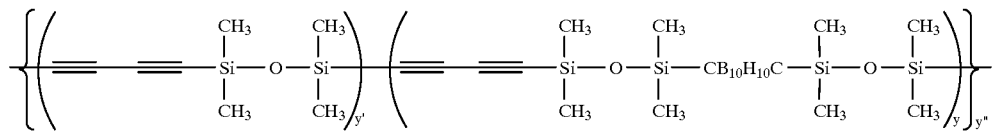

wherein y, y' and y" are integers and wherein the ratio of y' to y is 9:1.

Example 1
Oxidation of Carbon Fibers. (Comparative Example)

Carbon fibers were weighed onto a TGA platinum pan and dried by heating to 200° C. under inert conditions. Heat treatment of the fibers to 1000° C. under a flow of air resulted in a catastrophic decomposition of the fibers between 600 and 800° C. At 800° C. the carbon fibers had been completely consumed.

Example 2
Coating of Carbon Fibers with Poly (Carborane-Siloxane-Acetylene)

A sample (0.06 g) of poly (carborane-siloxane-acetylene) was weighed into a 30 ml beaker. Methylene chloride (0.5 ml) was added with stirring to dissolve the polymer. Chopped carbon fibers were then dipped into the solution and air dried initially. The coated fibers were irradiated by uv light for 5 hours in an attempt to obtain some cross-linking involving the acetylenic linkages. A sample of the coated fibers were then placed in a TGA platinum pan and a thermogram was obtained to 1000° C. During the heat treatment at 10° C./min, the sample lost approximately 15% weight. Upon cooling, the ceramic coated carbon fibers was reheated in the TGA chamber to 1000° C. under a flow of air (50 cc/min). The sample was completely stable to 600° C. Between 600 and 800° C., the ceramic coated carbon fibers lost about 27% weight. From 800 to 1000° C., no further weight loss was observed. The observed weight loss may be due to microcracking that occurred during the heat treatment and formation of the ceramic coating on the carbon fibers. Such microcracking would allow some oxidation to occur before the boron can oxidize and seal the cracks resulting in a cessation of oxidation of the carbon. Upon cooling back to room temperature, the sample was rescanned several time under a flow of air to 1000° C. No further changes were observed. The sample was then aged in a flow of air at 400, 500, 600, 700, 800, and 900° C. for 5 hours at each temperature resulting in no weight loss but an increase in weight of about 0.7% was observed.

Example 3
Multiple Ceramic Coatings on Carbon Fibers to Protect Against Oxidation Carbon fibers were dipped into a dilute methylene chloride solution of poly (carborane-siloxane-acetylene). After air drying, the fiber were placed into an oven preheated to 300° C. and heated for 30 minutes to convert the film of poly (carborane-siloxane-acetylene) to a thermoset. The coated fibers were then placed into a TGA platinum pan and heated at 10° C./min to 1000° C. in a flow of nitrogen. Upon cooling, the ceramic coated fibers were removed from the pan and dipped into the solution of poly (carborane-siloxane-acetylene) prepared above. After air drying, the fiber were placed into an oven preheated to 300° C. and heated for 30 minutes to convert the film of poly (carborane-siloxane-acetylene) to a thermoset. The second layer coated fibers were then placed into a TGA platinum pan and heated at 10° C./min to 1000° C. in a flow of nitrogen. Upon cooling the ceramic coated fibers were removed from the pan and again dipped into the solution of poly (carborane-siloxane-acetylene) prepared above. After air drying, the fibers were placed into an oven preheated to 300° C. and heated for 30 minutes to convert the film of poly (carborane-siloxane-acetylene) to a thermoset. The third layer coated fibers were then placed into a TGA platinum pan and heated at 10° C./min to 1000° C. in a flow of nitrogen. Upon cooling to room temperature, the carbon fibers coated with three layers of ceramic material were heated at 10° C./min to 1000° C. under a flow of air (50 cc/min). The coated fibers did not lose any weight until above 600° C. Between 600 and 800° C., the coated fiber composition lost about 49% weight. No further weight loss was observed upon heat treatment to 1000° C.

Example 4
Formation of Oxidatively Stable Carbon Fiber/Ceramic Composite by Slow Heat Treatment Carbon fibers were dipped into a dilute methylene chloride solution of poly (carborane-siloxane-acetylene). After air drying, the fiber were placed into an oven preheated 300° C. and heated for 1 hour to convert the film of poly (carborane-siloxane-acetylene) to a thermoset. The coated fibers were then placed into a TGA platinum pan. Poly (carborane-siloxane-acetylene) was then added to the pan to cover the fibers. The fiber/poly (carborane-siloxane-acetylene) composition was then slowly heated at 1° C./min to 1000° C. in a flow of nitrogen. At 1000° C. the carbon fiber/ceramic composite exhibited a char yield of about 87%. Upon cooling back to room temperature, the composite was heated in a flow of air (50 cc/min) at 1° C./min to 1000° C. From 100 to about 515° C., the composite gained about 0.2% weight. From 515 to about 680° C., the composite lost about 3.5% weight. Between 680 and 920° C., an additional 0.5% weight was lost. Between 920 and 1000° C., some weight gain was observed.

Example 5
Oxidative Aging Studies on Carbon Fiber/Ceramic Composite

The carbon fiber/ceramic composite from Example 4 was further aged in a flow of air (50 cc/min) at 400, 500, 600, and 700° C. for 5 hours at each temperature. The ramp rate was 10° C./min. During the heat treatment at 400° C., the composite sample gained about 0.4% weight. Very little weight changes occurred for the additional heat treatments at 500, 600, and 700° C. Examples 4 and 5 demonstrate that it is possible to protect carbon fibers against oxidation by slowly increasing the temperature during the preparation of the thermoset based composite and conversion to a carbon fiber/ceramic composite.

Example 6
Fabrication of Carbon Reinforced Composite Using Woven Carbon Fabric (T-650, 5K) and Poly (Carborane-Siloxane-Acetylene) Copolymer (10/90) by Resin Infusion Molding A dam (6"×6") was built on an aluminum plate by using a high temperature sealant tape on top of ¼" rods. Poly (carborane-siloxane-acetylene) copolymer (8.12 g) was placed evenly inside of the dam. Six layers of woven carbon fabric (T-650, 5K) were placed on top of the copolymer. A peel ply, porous bleaders, and a caul plate made of aluminum was then placed on top of the carbon fabric. The aluminum plate assembly was vacuum sealed inside of kapton film. A vacuum was then pulled on the system while heating. At 100° C., it was observed that the copolymer had soaked through the carbon fabric into the bleader. The fabrication of the composite was achieved by the following cure cycle: 200° C. for 1.5 hours, 250° C. for 1.5 hours, and 300° C. for 1 hours.

Example 7
Oxidative Studies on Silicon Carbide Fibers (Comparative Example)

Chopped silicon carbide (SiC) fibers were weighed into a TGA platinum pan and dried by heating at 300° C. for 30 minutes under a nitrogen atmosphere. Upon cooling the fibers were heated at 10° C./min under a flow of air (50 cc/min) to 1000° C. No weight loss occurred during the heat treatment. Moreover, about 1.2% weight gain was observed due apparently to some surface oxidation.

Example 8
Formation of Silicon Carbide/Ceramic Composite by Slow Heat Treatment of Silicon Carbide/Poly (Carborane-Siloxane-Acetylene) Composition Silicon Carbide fibers were dipped into a dilute methylene chloride solution of poly (carborane-siloxane-acetylene). After air drying, the coated fibers were placed into a TGA platinum pan. Poly (carborane-siloxane-acetylene) was then added to the pan to cover the fibers. The fiber/poly (carborane-siloxane-acetylene) composition was then slowly heated at 1° C./min to 1000° C. in a flow of nitrogen. At 1000° C., the carbon fiber/ceramic composite exhibited a char yield of about 88%. Upon cooling back to room temperature, the composite was heated in a flow of air (50 cc/min) at 1° C./min to 1000° C. From 100 to 1000° C., the composite gained about 0.75% weight.

Example 9
Formation of Silicon Carbide/Ceramic Composite by Slow Heat Treatment of Silicon Carbide/Poly (Carborane-Siloxane-Acetylene) Copolymer Composition Silicon Carbide fibers were dipped into a dilute methylene chloride solution of poly (carborane-siloxane-acetylene) copolymer containing 10 molar percent of carborane. After air drying, the coated fibers were placed into a TGA platinum pan. Poly (carborane-siloxane-acetylene) copolymer was then added to the pan to cover the fibers. The fiber/poly (carborane-siloxane-acetylene) copolymer composition was then slowly heated at 1° C./min to 1000° C. in a flow of nitrogen. At 1000° C., the carbon fiber/ceramic composite exhibited a char yield of about 87%. Upon cooling back to room temperature, the composite was heated in a flow of air (50 cc/min) at 1° C./min to 1000° C. From 100 to 1000° C., the composite gained about 0.85% weight.

Obviously, many modifications and variations of the present invention are possible in light of the above teachings. It is therefore to be understood that, within the scope of the appended claims, the invention may be practiced otherwise than as specifically described.

What is claimed is:

1. An oxidation resistant fiber/thermoset composite made by a process comprising the steps of
   (a) applying a solution that comprises a first linear polymer having a repeating unit comprising at least one carboranyl group, at least one silyl or siloxyl group, and at least one acetylenic group, and a solvent to a fibrous material comprising fibers, and then allowing the solvent to evaporate, thereby creating a coating of the first linear polymer on fibers of the fibrous material, (b) impregnating the fibrous material having coated fibers with a resin that includes a second linear polymer having a repeating unit comprising at least one carboranyl group, at least one silyl or siloxyl group, and at least one acetylenic group, wherein the first linear polymer and the second linear polymer are the same or different, and (c) curing the impregnated fibrous material to create a fiber/thermoset composite.

2. The oxidation resistant fiber/thermoset composite made by the process of claim 1 wherein the process includes the additional step of curing the coating of the first linear polymer on the fibrous material before the step of impregnating the coated fibrous material with the resin that includes the second linear polymer.

3. The oxidation resistant fiber/thermoset composite made by the process of claim 1 wherein the process includes the additional step of pyrolyzing the coating of the first linear polymer on the fibrous material before the step of impregnating the coated fibrous material with the resin that includes the second linear polymer.

4. An oxidation resistant fiber/ceramic composite made by a process comprising the steps of (a) applying a solution that comprises a first linear polymer having a repeating unit comprising at least one carboranyl group, at least one silyl or siloxyl group, and at least one acetylenic group, and a solvent to a fibrous material comprising fibers, and then allowing the solvent to evaporate, thereby creating a coating of the first linear polymer on fibers of the fibrous material, (b) impregnating the coated fibrous material with a resin that includes a second linear polymer having a repeating unit comprising at least one carboranyl group, at least one silyl or siloxyl group, and at least one acetylenic group, wherein the first linear polymer and the second linear polymer are the same or different, and (c) pyrolyzing the impregnated fibrous material to create a fiber/ceramic composite.

5. The oxidation resistant fiber/ceramic composite of claim 4 wherein the first linear polymer and the second linear polymer are the same and are selected from the group consisting of

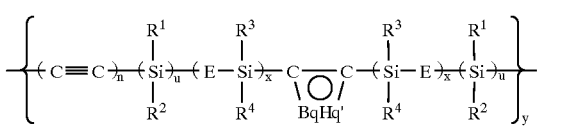

wherein:

(1) n is an integer from 1 to 12 and u and y are positive integers;

(2)

represents an unconjugated acetylenic group or conjugated acetylenic groups when n is an integer greater than 1;

(3) $R^1$, $R^2$, $R^3$ and $R^4$ are the same or different and are selected from the group consisting of alkyl, aryl, alkylaryl, haloalkyl, haloaryl and mixtures thereof;

(4)

represents said at least one carboranyl group; and (5) q and q' are integers from 3 to 16;

(6) x represents an integer greater than or equal to zero; and (7) E is selected from the group consisting of O, an aliphatic bridge, an aryl bridge and mixtures thereof; and

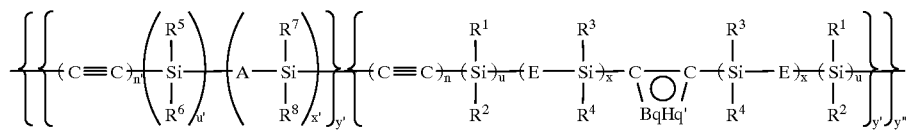

wherein (1) n and n' are integers from 1 to 12 and u, u', y, y' and y" are positive integers;

(2)

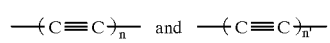

represent unconjugated acetylenic groups or conjugated acetylenic groups when n and n' are integers greater than 1;

(3) $R^1$, $R^2$, $R^3$, $R^4$, $R^5$, $R^6$, $R^7$ and $R^8$ are the same or different and are selected from the group consisting of alkyl, aryl, alkylaryl, haloalkyl, haloaryl and mixtures thereof;

(4)

represents said at least one carboranyl group; and (5) q and q' are integers from 3 to 16;

(6) x and x' represent integers greater than or equal to zero; and (7) E is selected from the group consisting of O, an aliphatic bridge, an aryl bridge and mixtures thereof;

(8) A is selected from the group consisting of O, an aliphatic bridge, an aryl bridge and mixtures thereof (9) wherein A and E are the same or different.

6. The oxidation resistant fiber/ceramic composite of claim 5 wherein the first linear polymer is applied to the fibrous material in the form of a mixture that further includes a polymer of the formula:

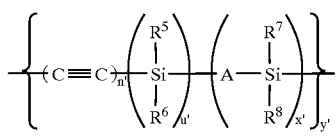

wherein:
(1) n' is an integer from 1 to 12 and u' and y' are positive integers;
(2)

represents an unconjugated acetylenic group or conjugated acetylenic groups when n is an integer greater than 1;
(3) $R^5$, $R^6$, $R^7$, $R^8$ are the same or different and are selected from the group consisting of alkyl, aryl, alkylaryl, haloalkyl, haloaryl and mixtures thereof;
(4) x' represents an integer greater than or equal to zero; and
(5) A is selected from the group consisting of O, an aliphatic bridge, an aryl bridge and mixtures thereof.

7. The oxidation resistant fiber/ceramic composite of claim 5 wherein the resin further includes a polymer of the formula:

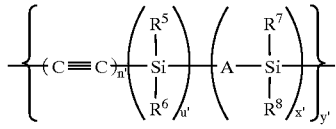

wherein:
(1) n' is an integer from 1 to 12 and u' and y' are positive integers;
(2)

represents an unconjugated acetylenic group or conjugated acetylenic groups when n is an integer greater than 1;
(3) $R^5$, $R^6$, $R^7$, $R^8$ are the same or different and are selected from the group consisting of alkyl, aryl, alkylaryl, haloalkyl, haloaryl and mixtures thereof;
(4) x' represents an integer greater than or equal to zero; and
(5) A is selected from the group consisting of O, an aliphatic bridge, an aryl bridge and mixtures thereof.

8. The oxidation resistant fiber/ceramic composite of claim 4 wherein the first linear polymer and the second linear polymer are the same and are represented by the formula:

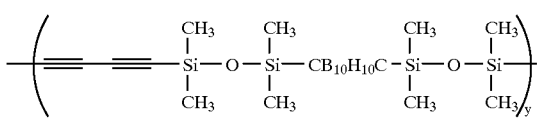

where y is a positive integer.

9. The oxidation resistant fiber/ceramic composite of claim 4 wherein the fibrous material is carbon fibers.

10. The oxidation resistant fiber/ceramic composite of claim 4 wherein the fibrous material is silicon carbide fibers.

11. The oxidation resistant fiber/ceramic composite of claim 4 wherein the step of pyrolyzing the impregnated fibrous material is carried out by heating the impregnated fibrous material to a temperature above about 700° C. and wherein the heating of the impregnated fibrous material between the temperatures of about 500° C. and about 700° C. is carried out at a rate of less than about 1° C. per minute.

12. The oxidation resistant fiber/ceramic composite of claim 4 wherein the process includes the additional step of curing the coating of the first linear polymer on the fibrous material before the step of impregnating the coated fibrous material with the resin that includes the second linear polymer.

13. The oxidation resistant fiber/ceramic composite made by the process of claim 12 wherein the steps of applying the first linear polymer to the fibrous material and of curing the coating of the first linear polymer on the fibrous material are repeated at least one time to create layers of a thermoset coating on the fibrous material before the step of impregnating the coated fibrous material with the the resin that includes the second linear polymer.

14. The oxidation resistant fiber/ceramic composite made by the process of claim 4 wherein the process includes the additional step of pyrolyzing the coating of the first linear polymer on the fibrous material before the step of impregnating the coated fibrous material with resin that includes the second linear polymer.

15. The oxidation resistant fiber/ceramic composite made by the process of claim 14 wherein the steps of applying the first linear polymer to the fibrous material and of pyrolyzing the coating of the first linear polymer on the fibrous material are repeated at least one time to create layers of a ceramic coating on the fibrous material before the step of impregnating the coated fibrous material with the resin that includes the second linear polymer.

16. A method of making an oxidation resistant fiber/thermoset composite comprising the steps of
(a) applying a solution that comprises a first linear polymer having a repeating unit comprising at least one carboranyl group, at least one silyl or siloxyl group, and at least one acetylenic group, and a solvent to a fibrous material comprising fibers, and then allowing the solvent to evaporate, thereby creating a coating of the first linear polymer on fibers of the fibrous material,
(b) impregnating the coated fibrous material with a resin that includes a second linear polymer having a repeating unit comprising at least one carboranyl group, at least one silyl or siloxyl group, and at least one acetylenic group, wherein the first linear polymer and the second linear polymer are the same or different, and
(c) curing the impregnated fibrous material to create a fiber/thermoset composite.

17. The method of claim 16 including the additional step of curing the coating of the first linear polymer on the fibrous material before the step of impregnating the coated fibrous material with the resin that includes the second linear polymer.

18. The method of claim 16 including the additional step of pyrolyzing the coating of the first linear polymer on the fibrous material before the step of impregnating the coated fibrous material with the resin that includes the second linear polymer.

19. A method of making an oxidation resistant fiber/ceramic composite comprising the steps of
(a) applying a solution that comprises a first linear polymer having a repeating unit comprising at least one carboranyl group, at least one silyl or siloxyl group, and at least one acetylenic group, and a solvent to a fibrous material comprising fibers, and then allowing the solvent to evaporate, thereby creating a coating of the first linear polymer on fibers of the fibrous material, (b) impregnating the coated fibrous material with a resin that includes a second linear polymer having a repeating unit comprising at least one carboranyl group, at least one silyl or siloxyl group, and at least one acetylenic group, wherein the first linear polymer and the second linear polymer are the same or different, and (c) pyrolyzing the impregnated fibrous material to create a fiber/ceramic composite.

20. The method of claim 19 wherein the first and second linear polymers are the same and are selected from the group consisting of

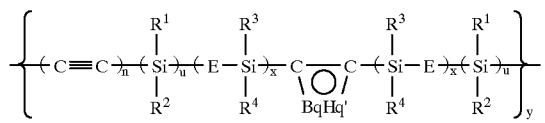

wherein:
(1) n is an integer from 1 to 12 and u and y are positive integers;
(2)

represents an unconjugated acetylenic group or conjugated acetylenic groups when n is an integer greater than 1;
(3) $R^1$, $R^2$, $R^3$ and $R^4$ are the same or different and are selected from the group consisting of alkyl, aryl, alkylaryl, haloalkyl, haloaryl and mixtures thereof;

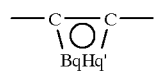

(4) represents said at least one carboranyl group; and
(5) q and q' are integers from 3 to 16;
(6) x represents an integer greater than or equal to zero; and
(7) E is selected from the group consisting of O, an aliphatic bridge, an aryl bridge and mixtures thereof; and

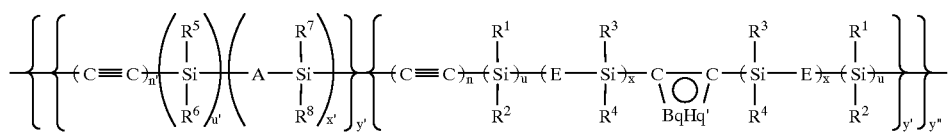

wherein
(1) n and n' are integers from 1 to 12 and u, u', y, y' and y" are positive integers;

(2)

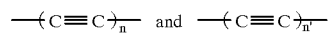

represent unconjugated acetylenic groups or conjugated acetylenic groups when n and n' are integers greater than 1;
(3) $R^1$, $R^2$, $R^3$, $R^4$, $R^5$, $R^6$, $R^7$ and $R^8$ are the same or different are selected from the group consisting of alkyl, aryl, alkylaryl, haloalkyl, haloaryl and mixtures thereof;
(4)

represents said at least one carboranyl group; and
(5) q and q' are integers from 3 to 16;
(6) x and x' represent integers greater than or equal to zero; and
(7) E is selected from the group consisting of O, an aliphatic bridge, an aryl bridge and mixtures thereof;
(8) A is selected from the group consisting of O, an aliphatic bridge, an aryl bridge and mixtures thereof
(9) wherein A and E are the same or different.

21. The method of claim 20 wherein the first linear polymer is applied to the fibrous material in the form of a mixture that further includes a polymer of the formula:

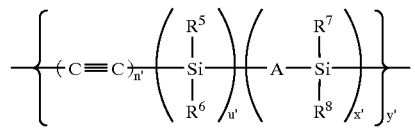

wherein:
(1) n' is an integer from 1 to 12 and u' and y' are positive integers;
(2)

represents an unconjugated acetylenic group or conjugated acetylenic groups when n is an integer greater than 1;
(3) $R^5$, $R^6$, $R^7$, $R^8$ are the same or different and are selected from the group consisting of alkyl, aryl, alkylaryl, haloalkyl, haloaryl and mixtures thereof;

(4) x' represents an integer greater than or equal to zero; and
(5) A is selected from the group consisting of O, an aliphatic bridge, an aryl bridge and mixtures thereof.

22. The method of claim 20 wherein the resin further includes a polymer of the formula:

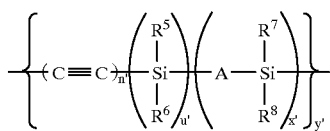

wherein:
(1) n' is an integer from 1 to 12 and u' and y' are positive integers;
(2)

represents an unconjugated acetylenic group or conjugated acetylenic groups when n is an integer greater than 1;
(3) $R^5$, $R^6$, $R^7$, $R^8$ are the same or different and are selected from the group consisting of alkyl, aryl, alkylaryl, haloalkyl, haloaryl and mixtures thereof;
(4) x' represents an integer greater than or equal to zero; and
(5) A is selected from the group consisting of O, an aliphatic bridge, an aryl bridge and mixtures thereof.

23. The method of claim 19 wherein the first linear polymer and the second linear polymer are the same and are represented by the formula:

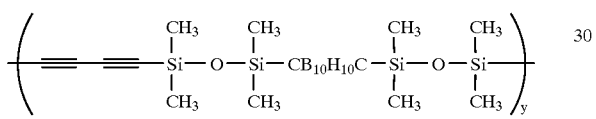

where y is a positive integer.

24. The method of claim 19 wherein the fibrous material is carbon fibers.

25. The method of claim 19 wherein the fibrous material is silicon carbide fibers.

26. The method of claim 19 wherein the step of pyrolyzing the fibrous material is carried out by heating the fibrous material to a temperature above about 700° C. and wherein the heating of the fibrous material between the temperatures of about 500° C. and about 700° C. is carried out at a rate of less than about 1° C. per minute.

27. The method of claim 19 including the additional step of curing the coating of the first linear polymer on the fibrous material before the step of impregnating the coated fibrous material with the resin that includes the second linear polymer.

28. The method of claim 19 including the additional step of pyrolyzing the coating of the first linear polymer on the fibrous material before the step of impregnating the coated fibrous material with the resin that includes the second linear polymer.

29. A fiber/ceramic composite made by the process of
(a) applying a coating comprising a first linear polymer to the surfaces of a fibrous material, the first linear polymer having a repeating unit comprising at least one carboranyl group, at least one silyl or siloxyl group, and at least one acetylenic group,
(b) curing the first linear polymer to create a thermoset coating on the fibrous material,
(c) pyrolyzing the thermoset coated fibrous material to create a ceramic coating on the fibrous material,
(d) impregnating the ceramic coated fibrous material with a resin that includes a second linear polymer having a repeating unit comprising at least one carboranyl group, at least one silyl or siloxyl group, and at least one acetylenic group, wherein the first linear polymer and the second linear polymer are the same or different,
(e) curing the impregnated fibrous material to create a fiber/thermoset composite,
(f) pyrolyzing the fiber/thermoset composite to create a fiber/ceramic composite.

* * * * *